(12) United States Patent
Mitsam et al.

(10) Patent No.: US 7,900,678 B2
(45) Date of Patent: Mar. 8, 2011

(54) DEVICE FOR APPLYING AT LEAST ONE SURFACE SECTION OF A TRANSFER LAYER OF A TRANSFER FILM TO A WEB OF MATERIAL AND THE USE THEREOF

(75) Inventors: Reinwald Mitsam, Langenzenn (DE); Michael Gwosdz-Kaupmann, Zirndorf (DE)

(73) Assignee: Leonhard Kurz Stiftung & Co. KG, Furth (DE)

( * ) Notice: Subject to any disclaimer, the term of this patent is extended or adjusted under 35 U.S.C. 154(b) by 966 days.

(21) Appl. No.: 11/570,344

(22) PCT Filed: Jun. 10, 2005

(86) PCT No.: PCT/DE2005/001039
§ 371 (c)(1),
(2), (4) Date: Apr. 2, 2007

(87) PCT Pub. No.: WO2005/120832
PCT Pub. Date: Dec. 22, 2005

(65) Prior Publication Data
US 2007/0181260 A1    Aug. 9, 2007

(30) Foreign Application Priority Data
Jun. 11, 2004  (DE) .......................... 10 2004 028 524

(51) Int. Cl.
*B32B 15/00*    (2006.01)
(52) U.S. Cl. ......... 156/541; 100/327; 156/238; 156/542; 156/566
(58) Field of Classification Search .......................... None
See application file for complete search history.

(56) References Cited

U.S. PATENT DOCUMENTS

| | | | | |
|---|---|---|---|---|
| 3,910,263 | A | * 10/1975 | Wallander | ........................ 602/32 |
| 3,948,709 | A | 4/1976 | Ida et al. | |
| 4,231,297 | A | * 11/1980 | Holbek | ........................... 108/10 |
| 4,701,235 | A | 10/1987 | Mitsam | |
| 4,802,949 | A | * 2/1989 | Mitsam | ......................... 156/540 |
| 4,909,888 | A | 3/1990 | Kobayashi et al. | |

(Continued)

FOREIGN PATENT DOCUMENTS

DE        3210551        10/1983

(Continued)

OTHER PUBLICATIONS

Japanese Office Action dated Oct. 19, 2010 in Japanese Application No. 2007-526188.

*Primary Examiner* — Philip C Tucker
*Assistant Examiner* — Kimberly K McClelland
(74) *Attorney, Agent, or Firm* — Hoffman & Baron, LLP

(57) ABSTRACT

The invention concerns an apparatus for applying at least one surface portion of a transfer layer of a transfer film to a web of material, wherein the apparatus has at least one support roller and at least one pressure roller for pressing the web of material and the transfer firm against the at least one support roller, wherein the at least one pressure roller is pneumatically or hydraulically resiliently supported by means of at least one resilient arrangement in the form of a diaphragm spring and wherein the apparatus has at least one adjusting device for varying a spring rate of the at least one resilient arrangement and thus for varying a pressure contact force of the at least one pressure roller against the at least one support roller, and the use of such an apparatus.

23 Claims, 10 Drawing Sheets

U.S. PATENT DOCUMENTS

| | | | |
|---|---|---|---|
| 5,368,680 A | 11/1994 | Mitsam | |
| 5,923,935 A | 7/1999 | Yamaguchi | |
| 2005/0211119 A1* | 9/2005 | Markhart | 101/401.1 |

FOREIGN PATENT DOCUMENTS

| | | |
|---|---|---|
| DE | 4116068 A1 | 11/1992 |
| DE | 4407618 A1 | 9/1995 |
| DE | 0958918 A1 | 11/1999 |
| EP | 1175997 | 1/2002 |
| JP | 58-197018 | 11/1983 |
| JP | 64-043442 | 2/1989 |
| JP | 9-236994 | 9/1997 |
| SU | 93477 | 1/1952 |

* cited by examiner

DEVICE FOR APPLYING AT LEAST ONE SURFACE SECTION OF A TRANSFER LAYER OF A TRANSFER FILM TO A WEB OF MATERIAL AND THE USE THEREOF

This application claims priority based on an International Application filed under the Patent Cooperation Treaty, PCT/DE2005/001039, filed on Jun. 10, 2005 and German Application No. 102004028524.1-16, filed on Jun. 11, 2004.

BACKGROUND OF THE INVENTION

The invention concerns an apparatus for applying at least one surface portion of a transfer layer of a transfer film to a web of material, wherein the apparatus has at least one support roller and at least one pressure roller for pressing the web of material and the transfer film against the at least one support roller, wherein the at least one pressure roller is resiliently supported by means of at least one resilient arrangement and wherein the apparatus has at least one adjusting device for varying a spring rate of the at least one resilient arrangement and thus for varying a pressure contact force of the at least one pressure roller against the at least one support roller. The invention further concerns the use of such an apparatus.

Differing pressure contact forces of pressure rollers against a support roller lead to differing adhesion of a transfer layer to the web of material and should therefore be avoided as far as possible. Plate springs have therefore already been used as an elastically resilient arrangement for such apparatuses, which plate springs have a strong damping action and, in each spring stroke movement, produce a differing pressure contact force in respect of the pressure roller against the support roller. It is therefore not possible to achieve reproducibility of the pressure contact force of a pressure roller against the support roller, with plate springs. Accordingly elastic coil springs have been used as the resilient arrangement for apparatuses of that kind, which in each spring stroke movement produce an identical pressure contact force for the pressure roller against the support roller. A respective coil spring is provided for each pressure roller, the respective coil spring being arranged adjacent the respective pressure roller and having to be individually adjusted by hand. For that purpose it is necessary for the machine in which the apparatus is fitted to be completely stopped.

The basic structure of a machine suitable for that purpose is to be found in DE 32 10 551 A1, in which it is possible to find an apparatus having a heated embossing or support roller and a group of pairs of pressure rollers. In that case a flexible web of material is drawn off a supply roll and brought together with an embossing or transfer film which is made up of a carrier or backing film and the transfer layer, over direction-changing rollers, and conveyed through a gap between the support roller and the pressure rollers. The pressure rollers are pressed against the transfer film, the web of material and the support roller by way of adjusting cylinders so as to provide the required pressure for transfer of the transfer layer of the transfer film on to the web of material. In that arrangement the pressure rollers are disposed in such a way that the web of material and the transfer film pass around the support roller over about 170° and a so-called roller cage is formed. After leaving the support roller the web of material which is provided with the transfer layer in region-wise manner or over its full surface area is separated from the carrier film and possibly non-transferred regions of the transfer layer. The pairs of pressure rollers are mounted on rocker arms which are in turn respectively tiltably mounted on angle levers. The angle levers are each tiltable about a respective axis which is parallel to the axis of rotation of the support roller.

In that case at the present time the width of the pressure rollers does not correspond to the entire width of the support roller but individually supported pairs of pressure rollers are usual for each trace or line to be transferred. In order to compensate for the deflection which occurs in that situation in respect of the carriers for the pressure rollers along the longitudinal axis of the support roller, a resilient mounting arrangement was provided for the pressure rollers by way of the coil springs.

When changing the web of material and/or the transfer film it is necessary for the pressure contact force of each pressure roller or each pair of pressure rollers against the support roller to be freshly adjusted. To do that the entire machine has to be stopped and the roller cage has to be pulled out from under the support roller. The coil spring of each individual pressure roller is adjusted by hand, the machine is re-started and the result is checked. Optimising the pressure contact force of the pressure rollers is thus extremely time-consuming and often takes days. In most cases the optimisation procedure is therefore already broken off prior to reaching the optimum in order to keep the amount of time involved and the material consumption within limits. Furthermore the use of coil springs suffers from the disadvantage that they are sensitive to corrosion and have to be replaced at regular intervals. Thus for example vapors which escape from the web of material or the transfer film have an adverse effect on the coil springs. As a consequence of the maintenance operations that makes renewed optimisation of the pressure contact forces necessary even without a change in the web of material or the transfer film.

SUMMARY OF THE INVENTION

Now the object of the invention is to provide an improved apparatus which permits uncomplicated and in particular rapid optimisation of the pressure contact force of at least one pressure roller against a support roller, and to provide for use thereof.

For the apparatus that object is attained in that the at least one pressure roller is pneumatically or hydraulically resiliently supported and wherein the at least one resilient arrangement is formed by a diaphragm spring, and wherein the diaphragm spring has a diaphragm chamber, a diaphragm dividing the diaphragm chamber into a primary side and a secondary side and a piston rigidly connected to the diaphragm on the secondary side for transmitting the spring force to the at least one pressure roller.

By virtue of a variation in the pneumatic or hydraulic pressure the pressure contact force of the pressure rollers can now be adjusted and varied in a simple manner while the machine is running as for that purpose the pressure rollers do not have to be pulled out from under the support roller. Replacement of the conventional pressure rollers by pneumatically or hydraulically resiliently supported pressure rollers can be effected quickly and easily. The time saving which can be achieved when starting up a fresh web of material and/or a fresh transfer film is enormous. The maintenance complication and expenditure is also drastically reduced when using pneumatically or hydraulically resiliently supported pressure rollers. In addition the apparatus according to the invention can also be used in machines which are already in existence as unsprung pressure rollers or pressure rollers which are sprung by way of plate or coil springs can be easily replaced by pneumatically or hydraulically sprung pressure rollers.

Diaphragm springs have the advantage that they take up little space and already operate without delay in the case of very slight piston movements, as almost exclusively occur in this field of use. In addition it is possible to use pistons of a freely selectable cross-section, for example a round or angular cross-section. That also makes it easier to use a diaphragm spring of that kind at locations involving a small available amount of space or a space which is full of nooks and crannies.

In order to avoid an unacceptable increase in pressure in the diaphragm spring upon inward resilient movement of the piston or the pressure roller, preferably either an air cushion is provided in the pneumatic springing arrangement on the primary side or a pressure regulator with load relief on the secondary side is employed therein. In a hydraulic system, preferably either a spring-loaded storage device or a pressure regulator with load relief on the secondary side is employed.

Mass-produced pneumatic or hydraulic cylinders require a very much larger amount of space than a diaphragm spring so that the use thereof is limited in particular by the usually only small amount of space available in the known machines. In general terms, in the present apparatus it is possible to achieve spring travel distances in the range of between 3 and 4 mm by way of diaphragm springs in dependence on the diaphragm used, but in that respect a diaphragm stroke of between 0.1 and 0.2 mm is already generally totally sufficient in the present area of use. The size of the diaphragm used can be matched in the optimum fashion to the available space.

It has been found to be advantageous if the at least one adjusting device for varying the spring rate of the resilient arrangement includes at least one control unit for adjusting the spring rate by way of at least one regulating valve, preferably an electrically adjustable proportional pressure regulating valve, and at least one supply line, wherein at least one of the supply lines is connected to the at least one resilient arrangement for supplying same with an adjusting medium which is formed by compressed air or a hydraulic fluid. In that case the control unit can be placed far away from the apparatus according to the invention or from the machine with the apparatus according to the invention, the supply lines ensuring a permanent supply of the adjusting medium to the resilient arrangements. Thus it is a particular advantage of the apparatus according to the invention that the at least one resilient arrangement is remotely controllable by the at least one control unit. It will be appreciated however that the regulating valve can also be directly manually actuated so that it is possible to dispense with a separate control unit. Optionally, it is possible to use a pressure booster to increase the available pressure of the adjusting medium. That is preferred in particular in relation to a pneumatic springing arrangement.

It is particularly preferred if the control unit is suitable for processing digital setting values. That makes it possible to input or store individual parameters which are already known, as a software program, for known combinations of webs of material and transfer films so that a test run for adjusting the pressure contact forces of the pressure rollers can be entirely omitted.

It is also preferable if the diaphragm spring has on the secondary side a sealing arrangement which protects the diaphragm spring from the ingress of dust and corrosive media. In that respect it has proven itself to be particularly advantageous if the sealing arrangement is formed from a preferably elastic seal and a seal cover, wherein the piston at its side remote from the diaphragm or parts which are fixedly connected thereto is/are guided through the seal. Dust in the region of the piston in the diaphragm chamber or corrosion of the piston or the inside wall of the diaphragm chamber can result for example in jamming of the piston movement, which prevents reproducible setting of pressure contact forces and makes it necessary to replace the diaphragm spring.

In regard to maintenance operations which are possibly required, it has proven to be desirable if the at least one pressure roller and thus also the at least one resilient arrangement is disposed on at least one carriage which is movable in the direction of the longitudinal axis of the at least one support roller. It is particularly preferred in that respect if the at least one carriage is movable at least by the length of the at least one support roller in the direction of the longitudinal axis of the at least one support roller so that the at least one pressure roller and the associated resilient arrangement can be pulled out completely from under the support roller. That may be necessary for example if pressure rollers have to be replaced or cleaned. It has proven to be desirable if, when moving the carriage out of its working positions the supply lines for the adjusting mechanism are automatically separated by way of couplings and are automatically re-connected when the carriage is pushed back into the working position. In that case, in hydraulic systems, leakage-free couplings have to be employed.

It is preferable if the at least one pressure roller shaft of the pressure roller is mounted in a bearing arrangement which is of a substantially U-shaped cross-section viewed perpendicularly to the longitudinal axis of the pressure roller shaft. That makes it possible for the means for suspending a pressure roller to be of an extremely compact configuration.

It has further proven to be desirable if the bearing arrangement is connected to a base plate by way of a bearing arrangement shaft, the bearing arrangement shaft being disposed parallel to the pressure roller shaft. The bearing arrangement shaft is fixed to the base plate in a similar manner to the way in which the pressure roller shaft is fixed to the bearing arrangement, preferably by means of screwthreaded pins. The bearing arrangement is thus rotatable about the bearing arrangement shaft so that the position of the pressure holler is adjustable by way of a variation in the position of the bearing arrangement.

It has proven to be desirable if the bearing arrangement has a travel pickup which bears loosely against the piston of the diaphragm spring or parts fixedly connected thereto in such a way that the pressure roller shaft is moved on a circular path around the bearing arrangement shaft upon a change in the position of the piston. It is also practicable if the bearing arrangement is hingedly connected to the piston in such a way that the pressure roller shaft moves on a circular path around the bearing arrangement shaft upon a change in the position of the piston. Deflection of the diaphragm of the diaphragm spring leads to a movement of the piston in the diaphragm chamber and thus a deflection of the travel pickup which leads to a deflection of the bearing arrangement and thus the pressure roller.

It is preferable if a spacer is arranged at the bearing arrangement and/or the base plate, which prevents direct contact between the bearing arrangement and the base plate. The spacer serves as an abutment to protect the diaphragm spring.

It is preferred if at least two pressure rollers are arranged in mutually parallel relationship along the longitudinal axis of the at least one support roller. In that case each of the parallel pressure rollers transfers a track of a transfer layer of a transfer firm on to a web of material. Accordingly the width of the support roller can be used a plurality of times for the transfer of a or different transfer layers which can be arranged on one or a plurality of transfer films.

It is easily possible with the apparatus according to the invention for the resilient arrangements of the at least two parallel pressure rollers to be connected to a respective separate supply line for the adjusting medium so that different pressure contact forces can be produced. That is desirable for example in particular when different track widths of a transfer layer are to be produced in mutually juxtaposed relationship on a web of material.

It has however also proven to be desirable if the resilient arrangements of the at least two parallel pressure rollers are connected to a common supply line for the adjusting medium. That option presents itself in particular when identical tracks are to be transferred in mutually juxtaposed relationship from the transfer film on to the web of material.

In order to facilitate the maintenance operations on the parallel pressure rollers, it has proven to be advantageous if the at least two parallel pressure rollers are arranged jointly on a first carriage which can be pulled out from under the support roller.

It has further proven to be desirable if at least two pressure rollers are arranged in a row along a support roller diameter so that a roller cage is formed. That considerably improves the transfer result and the adhesion of the transfer layer to the web of material.

Preferably, the resilient arrangements of the at least two pressure rollers which are arranged in a row are connected in that case to a respective separate supply line for the adjusting medium. In that way the pressure contact force of successive pressure rollers which successively press the same track of the transfer layer against the support roller can be set at a different value. It is particularly preferred in that respect if the pressure contact force of the pressure rollers which are arranged in a row is increased from one pressure roller to another. That gives an impeccable transfer result and affords particularly good adhesion of the transferred track of the transfer layer to the web of material.

It is particularly preferred if two pressure rollers are arranged on the base plate in a row along a support roller diameter, forming a pair of pressure rollers. In that case the pressure rollers of that pair follow in succession at a small spacing from each other and additionally improve the adhesion of the transfer layer to the web of material. In that case the pair of pressure rollers is arranged on a carriage, by way of which the pair can be moved in the direction of the longitudinal axis of the support roller.

In that respect it has proven to be desirable if the at least one resilient arrangement of the two pressure rollers which are arranged in a row is integrated into the base plate. In that case suitable arrangements are both those in which a common resilient arrangement is provided for the two pressure rollers, and also those in which respective separate resilient arrangements are provided for each of the two pressure rollers.

Preferably the at least one support roller is heated in order to provide for optimum transfer of the transfer layer on to the web of material and to reduce as far as possible the period of time required for satisfactory transfer of the transfer layer on to the web of material. An adhesive layer provided on the transfer layer can be caused to melt by the heat so that a strong adhesive join is established between the web of material and the transfer layer. The fact that a roller cage extends around the heated support roller produces an increase in the length of the contact section and thus increases the contact time between the webs and the support roller so that satisfactory transfer of the transfer layer on to the web of material is possible even when the webs are moving at a high speed.

A use of the apparatus according to the invention for at least region-wise transfer of a transfer layer of an embossing or stamping film on to a material to be embossed, preferably for forming security elements on value-bearing documents such as identity cards or passes, cards or banknotes, structural components or decorative elements, in particular in architecture or other technical areas, packaging materials, in particular in the pharmaceutical or foodstuffs industry or components in the electrical or electronic industry, is ideal.

BRIEF DESCRIPTION OF THE DRAWINGS

FIG. 1 shows an apparatus viewed in the direction of the longitudinal axis of a support roller, FIG. 2 shows the apparatus of FIG. 1 perpendicularly to the longitudinal axis of the support roller, FIG. 3 shows a sectional view in detail of the first carriage of FIG. 1, FIG. 4 shows a view on an enlarged scale of the first carriage in FIG. 3, FIG. 5 shows a view in an enlarged scale of FIG. 1 in the region of a pressure roller, FIG. 6 shows a view in an enlarged scale of FIG. 2 in the region of a pressure roller, FIG. 7 shows a sectional view in the region of a pressure roller from FIG. 6, FIG. 8 shows a plan view of the base plate of FIG. 4, FIG. 9 shows a graph in respect of the dependency between the pressure of the adjusting medium and the pressure contact force of pneumatically sprung pressure rollers as shown in FIGS. 1 through 7, and FIG. 10 shows the machine in accordance with DE 32 10 551 A1 to clearly illustrate the operating principle of an installation in which the apparatus according to the invention is preferably used.

DETAILED DESCRIPTION OF THE INVENTION

Figure 1:
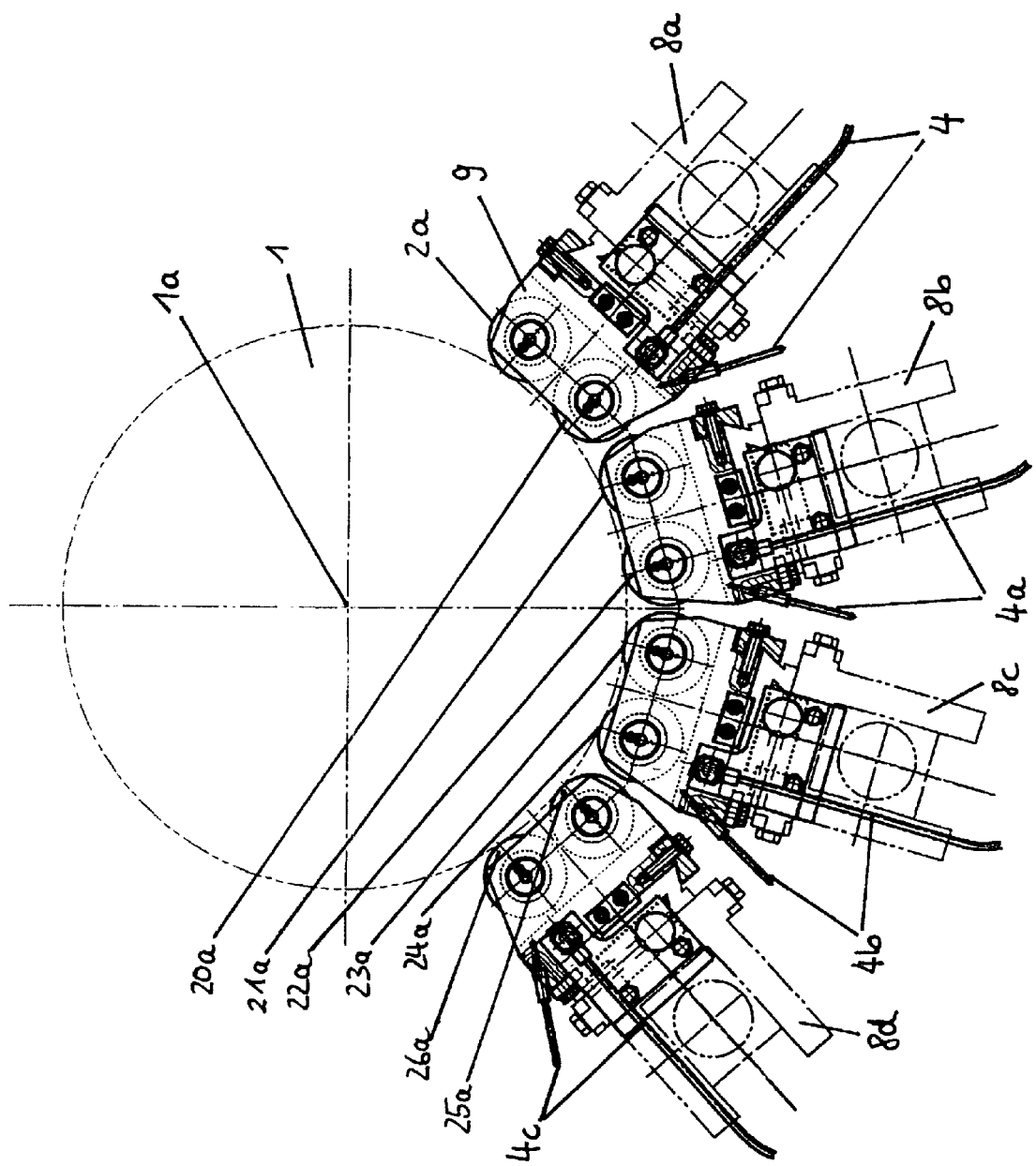
FIGS. 1 through 10 are intended to explain the apparatus according to the invention by way of example. In the Figures.

FIG. 1 shows an apparatus viewing in the direction of the longitudinal axis 1a of a heated support roller. It is possible to see from FIG. 1 four carriages 8a, 8b, 8c, 8d provided with pressure rollers 2a, 20a, 21a, 22a, 23a, 24a, 25a, 26a which form a roller cage and which press successively against the diameter of the support roller 1. In that case the pressure rollers 2a, 20a are arranged as a pair of pressure rollers on the first carriage 8a, the pressure rollers 21a, 22a are arranged as a pair of pressure rollers on the carriage 8b, the pressure rollers 23a, 24a are arranged as a pair of pressure rollers on the carriage 8c and the pressure rollers 25a, 26a are arranged as a pair of pressure rollers on the carriage 8d. In this case the pressure rollers are mounted in bearing arrangements 9 and are preferably formed from phenol resin pressing material or a similar material. A transfer film (not shown) and a web of material (not shown) are passed between the support roller 1 and the pressure rollers 2a, 20a, 21a, 22a, 23a, 24a, 25a, 26a for the transfer of a transfer layer of the transfer film on to the web of material, in which case the web of material and the transfer film are pressed against the heated support roller 1 by means of the pressure rollers 2a, 20a, 21a, 22a, 23a, 24a, 25a, 26a. Regarding the basic principle reference is directed to FIG. 10 which can be found in DE 32 10 551 A1. The pressure rollers 2a, 20a, 21a, 22a, 23a, 24a, 25a, 26a are pneumatically resiliently supported by means of a resilient arrangement (see the diaphragm spring 5 in FIG. 3 or FIG. 4). An adjusting device (not shown here) for varying a spring rate of the resilient arrangements of the pressure rollers 2a, 20a, 21a, 22a, 23a, 24a, 25a, 26a permits adjustment of the pressure contact force thereof against the support roller 1.

In this case supply lines 4, 4a, 4b, 4c which provide compressed air as the adjusting medium are connected to the resilient arrangements.

Figure 2:
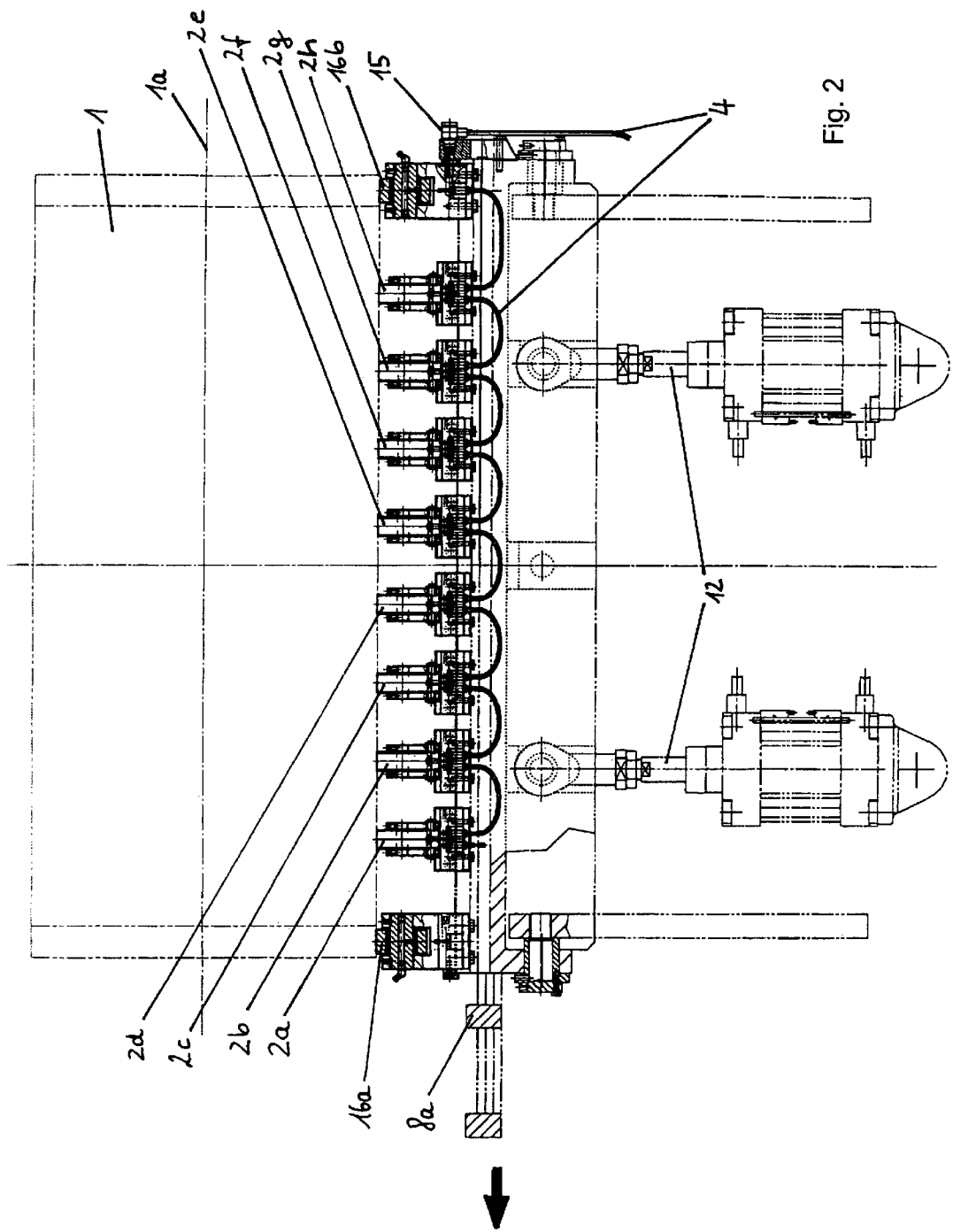

FIG. 2 shows the apparatus of FIG. 1 perpendicularly to the longitudinal axis of the heated support roller 1, looking on to the first carriage 8a. It is possible to see therefrom that a total of eight pressure rollers 2a, 2b, 2c, 2d, 2e, 2f, 2g, 2h are arranged in mutually juxtaposed relationship along the support roller 1, those rollers pressing a carrier film (not shown) which is guided through between the support roller 1 and the pressure rollers 2a, 2b, 2c, 2d, 2e, 2f, 2g, 2h against a web of material (not shown) which is also guided through therebetween and against the support roller 1. In this case transfer of a transfer layer of a transfer film on to a web of material is effected in the form of eight webs, the width of which corresponds to the width of a pressure roller 2a, 2b, 2c, 2d, 2e, 2f, 2g, 2h. A web which for example passes through between the pressure roller 2a and the support roller 1 passes subsequently to seven further pressure rollers 20a, 21a, 22a, 23a, 24a, 25a, 26a along the support roller 1. In total accordingly the roller cage illustrated here (see FIG. 1) is equipped with 64 pressure rollers. The carriage 8a is connected to two pressure cylinders 12 which are capable of transporting the carriage 8a including the pressure rollers 2a, 2b, 2c, 2d, 2e, 2f, 2g, 2h in the direction of the support roller 1 or away therefrom. The connection between the pressure cylinders 12 and the carriage 8a is releasable so that the carriage 8a can be moved in the direction of the longitudinal axis 1a of the support roller 1 in the direction indicated by the arrow when the pressure rollers 2a, 2b, 2c, 2d, 2e, 2f, 2g, 2h on the carriage 8a have been moved away from the support roller 1 by means of the pressure cylinders 12. The carriage 8a can be pulled out completely from under the support roller 1 in the direction indicated by the arrow so that replacement and maintenance of the carriage 8a and all parts disposed thereon is easily possible. The resilient arrangements of the pressure rollers 2a, 2b, 2c, 2d, 2e, 2f, 2g, 2h on the carriage 8a are connected to a supply line 4 which supplies them with compressed air. In that respect there is a coupling 15 which automatically cuts off and seals off the supply line 4 when the carriage 8a is pulled out in the direction indicated by the arrow. When the carriage 8a is pushed back under the support roller 1 the communication by way of the coupling 15 is automatically restored. Also arranged laterally on the carriage 8a are respective stationary support roller members 16a, 16b for the support roller, which come to bear against the support roller 1 only after the pressure rollers 2a, 2b, 2c, 2d, 2e, 2f, 2g, 2h and thus on the one hand permit adjustment of the pressure contact force of the pressure rollers 2a, 2b, 2c, 2d, 2e, 2f, 2g, 2h against the support roller and on the other hand prevent overloading of the pressure rollers 2a, 2b, 2c, 2d, 2e, 2f, 2g, 2h or the diaphragm springs 5. The support roller members 16a, 16b serve as an abutment for the pressure rollers 2a, 2b, 2c, 2d, 2e, 2f, 2g, 2h against the support roller 1 and thus define the limit position of the pressure rollers 2a, 2b, 2c, 2d, 2e, 2f, 2g, 2h.

Figure 3:
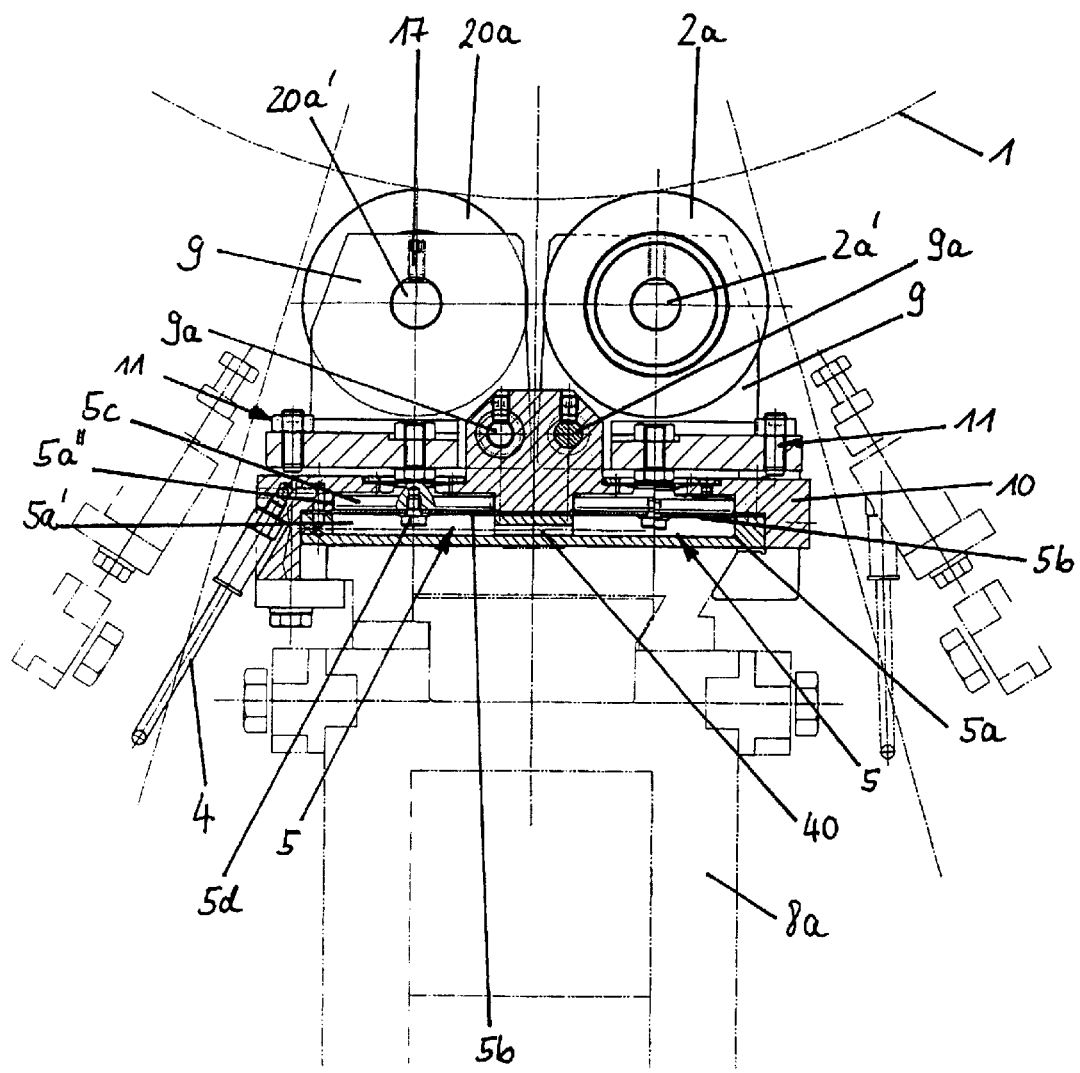

FIG. 3 shows a sectional view in detail of the first carriage 8a from FIG. 1. In this case the position of the support roller 1 can be seen having regard to the pressure rollers 2a, 20a. The pressure roller 2a is held in the bearing arrangement 9 by means of a pressure roller shaft 2a' which is arranged parallel to the longitudinal axis 1a of the support roller 1. The pressure roller shaft 2a' is secured by screwthreaded pins 17. The bearing arrangement 9 is hingedly connected to the base plate 10 by way of a bearing arrangement shaft 9a. An abutment 11 formed from a screwthreaded stud 11a and a securing nut 11b (see FIG. 4) prevents direct contact between the bearing arrangement 9 and the base plate 10 and protects the diaphragm spring 5 from overloading. The diaphragm spring 5 has a diaphragm chamber 5a and a diaphragm 5b which divides the diaphragm chamber 5a into a primary side 5a' and a secondary side 5a". Disposed on the secondary side 5a" is a piston 5c which is connected fixedly by way of a screw 5d to the diaphragm 5b. A connecting passage 40 here establishes a communication between the two diaphragm chambers 5a so that the same pressure prevails in both diaphragm chambers 5a.

Figure 4:
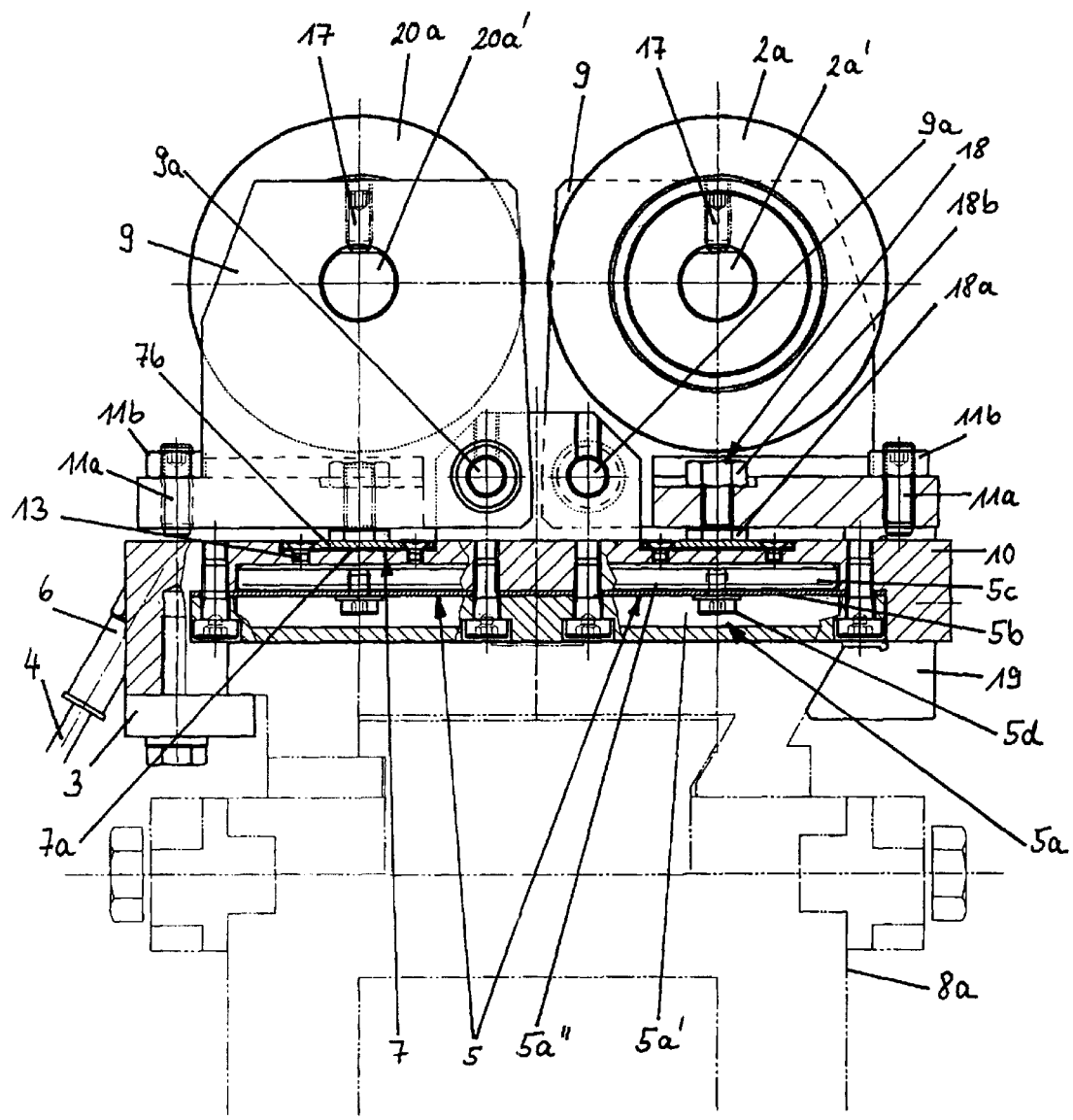

FIG. 4 shows an enlarged view of the first carriage 5a from FIG. 3, illustrating the two pressure rollers 2a, 20a and the pressure roller shafts 2a', 20a'. The base plate 10 is connected to the carriage 8a by way of a clamping shoe 19 and a cover 3. The supply line 4 supplies the two diaphragm springs 5 provided, which are of the same configuration and which respectively determine the position of the pressure rollers 2a, 20a arranged thereabove, with the same pneumatic pressure, and is fixed by way of a screw connection 6. The diaphragm 5b in the diaphragm chamber 5a is connected to the piston 5c by way of the screw 5d. The diaphragm chamber 5a is protected from dust and vapors by means of a sealing arrangement 7 formed by an elastic seal 7a and a sealing cover 7b which is fixed to the base plate 10 by means of screws 13. The bearing arrangement 9 has a travel pickup 18 which is formed by an adjusting screw 18a and a securing nut 18b and which is moved by the piston 5c. In that case the piston 5c acts directly on the travel pickup 18. The seal 7a is held in engagement at a groove in the screw 5d which is fixedly connected to the piston 5c and which is thus deemed to be included with the piston 5c (this can also be seen from the left-hand side in FIG. 3). Upon a change in the pressure of the compressed air on the primary side 5a' of the diaphragm spring 5 the diaphragm 5b is deflected and the piston 5c moved. As a result there is a change in the position of the travel pickup 18 and the bearing arrangement 9 fixedly connected thereto so that the position of the pressure roller shaft 2a, 20 arranged perpendicularly above the travel pickup 18 and therewith the pressure contact force of the pressure rollers 2a, 20a with respect to the support roller 1 is altered. It will be appreciated that, opposite to the arrangement illustrated here of the respective piston 5c and the travel pickup 18 perpendicularly to the pressure roller shaft 2a, 20a', it is also possible for the piston 5c and the travel pickup 18 to be arranged displaced in the direction of the abutment 11 or for the piston 5c to be pivotably connected to the bearing arrangement 9 so that force transmission is not effected perpendicularly beneath the pressure roller shaft 2a', 20a'. Greater degrees of deflection can be achieved in that way. The embodiment illustrated here provides a common supply line 4 for both diaphragm springs 5 so that the position of the pressure rollers 2a, 20a can only be changed respectively by the same value, but not by differing values. It will be noted however that this can be easily achieved when there is a separate supply for the two diaphragm springs 5 with compressed air by way of two separate supply lines 4' in which case however a plurality of couplings 15 have to be arranged at the carriage 8a.

Figure 5:
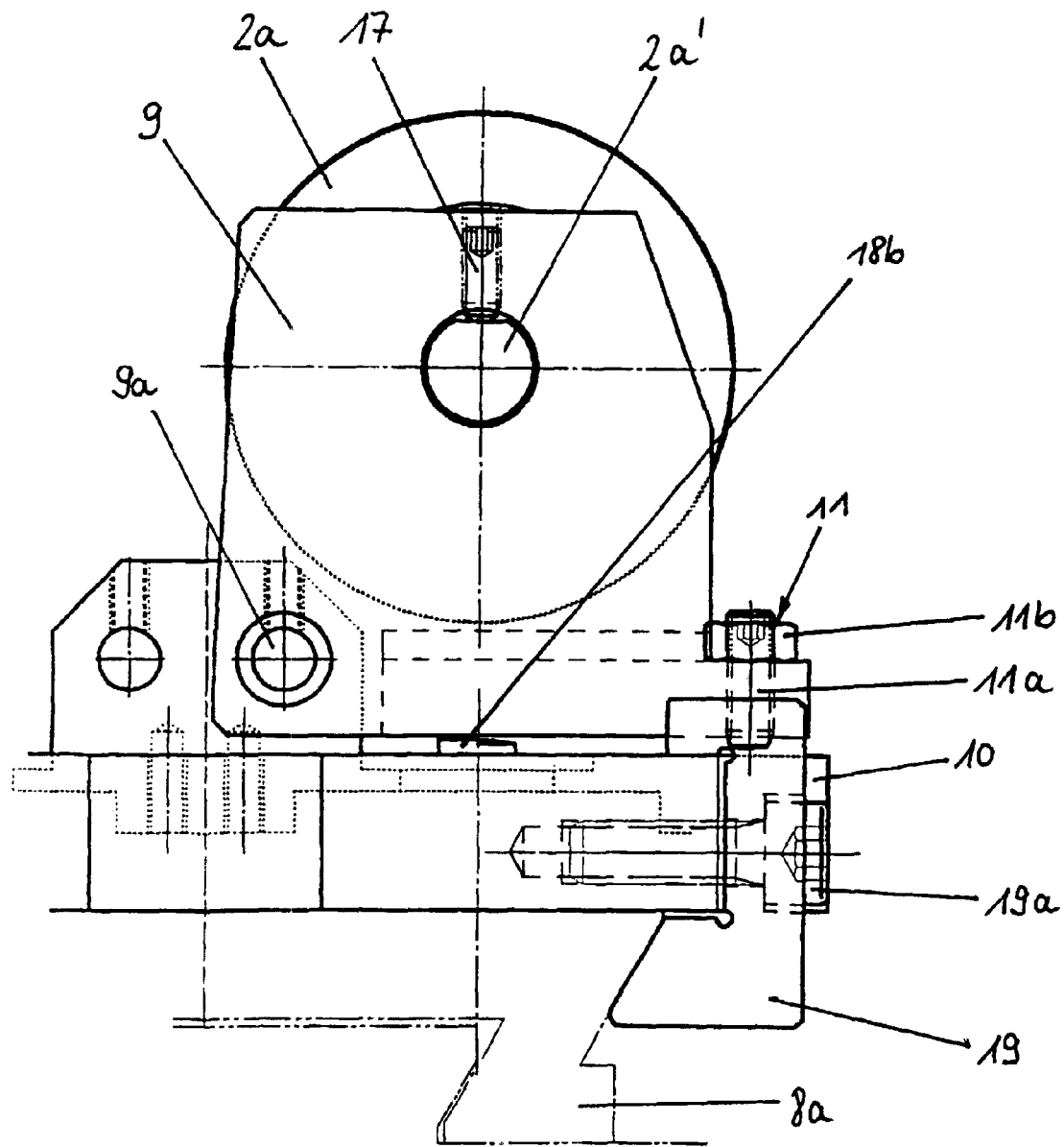

FIG. 5 shows a view on an enlarged scale of FIG. 1 in the region of the pressure roller 2a, showing the pressure roller shaft 2a' which has already been described hereinbefore and the screwthreaded pins 17 for fixing it to the bearing arrangement 9. The Figure also shows the bearing arrangement shaft 9a by way of which the bearing arrangement 9 is hingedly connected to the base plate 10 as well as the abutment 11 comprising the screwthreaded stud 11a and the securing nut 11b. The clamping shoe 19 connects the base plate 10 to the carriage 5a and is screwed to the base plate 10 by means of the screw 19a.

Figure 6:
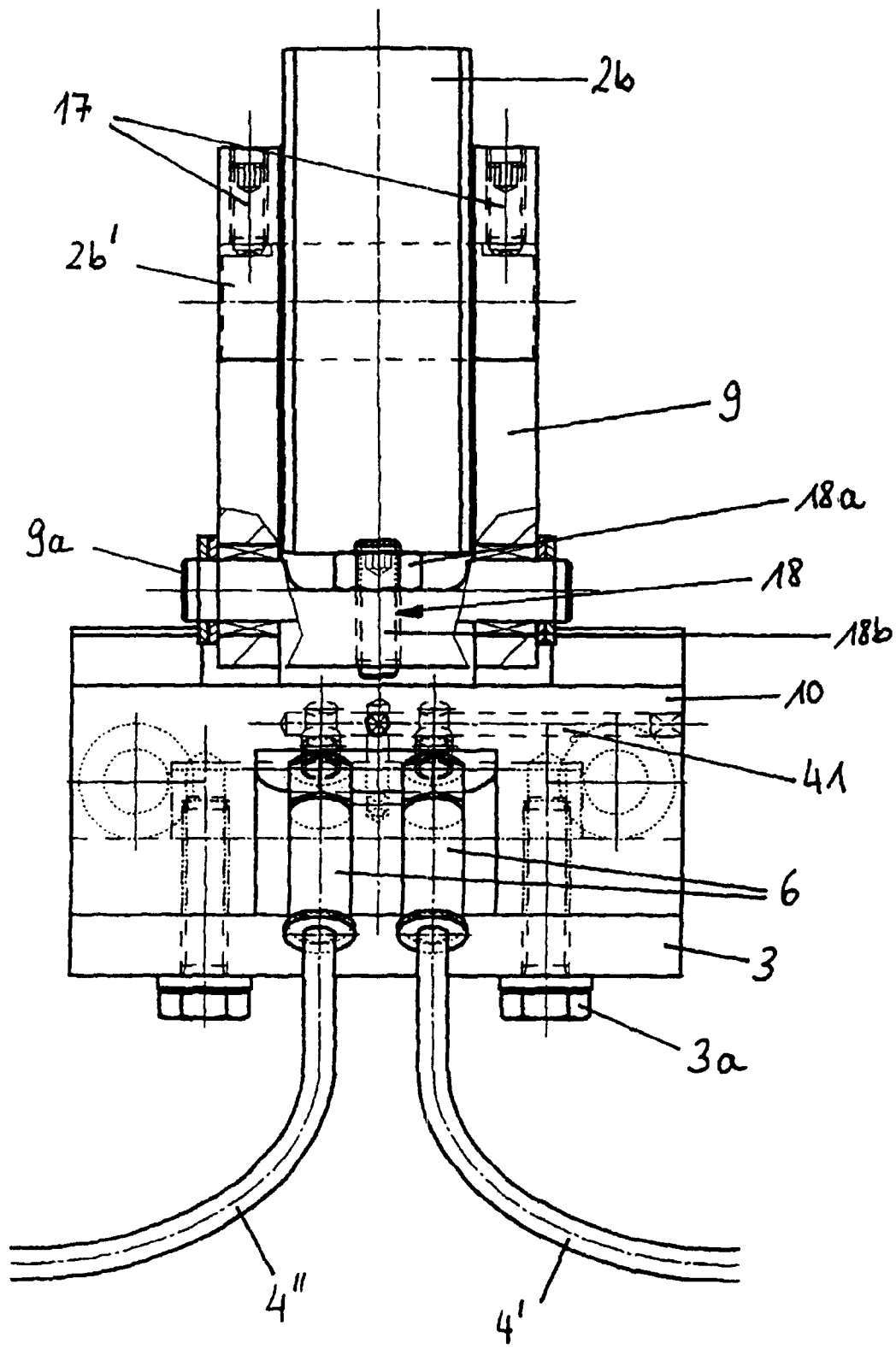

FIG. 6 shows a view on an enlarged scale of FIG. 2 in the region of the pressure roller 2b, showing the pressure roller shaft 2b, which is connected by way of the screwthreaded pins 17 to the substantially U-shaped bearing arrangement 9. The Figure also shows the bearing arrangement shaft 9a by way of which the bearing arrangement 9 is hingedly connected to the base plate 10, and the travel pickup 18. As shown in FIG. 2 the supply line 4' is passed to the resilient arrangements in the region of the adjacent pressure roller 2c while the supply line 4" leads to the resilient arrangements of the pressure rollers 2a, 20a. In this case the supply lines 4', 4" are connected to the base plate 10 by way of the screw means 6. Provided within the base plate 10 is a communication between the supply lines 4', 4" by way of a passage 41 and also a communication with the two diaphragm chambers 5a. The cover 3 and the screws 3a for fixing the cover 3 can also be seen from the Figure.

Figure 7:
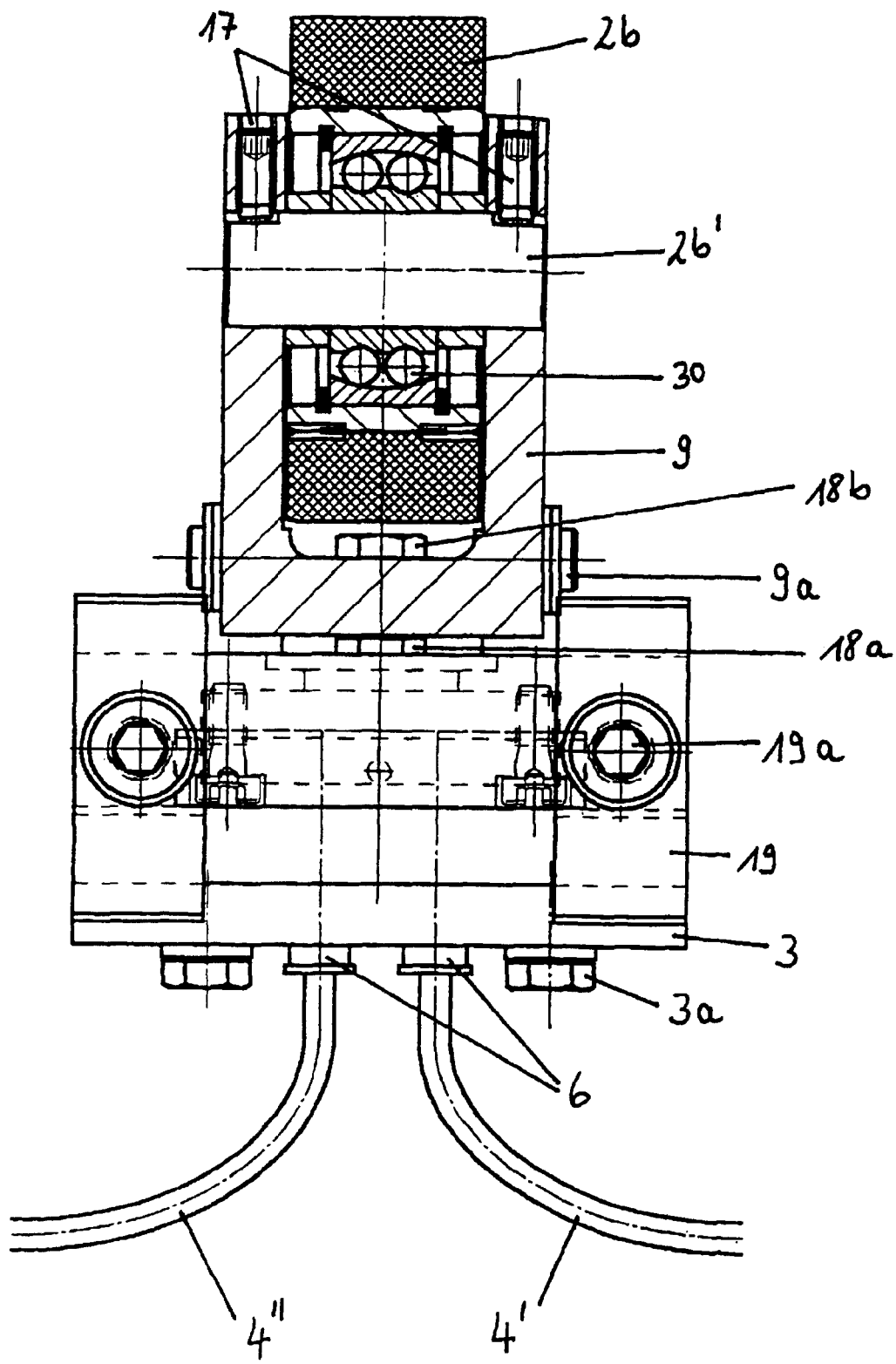

FIG. 7 shows a view in section in the region of the pressure roller 2b in FIG. 6. In this case a self-aligning ball bearing 30 can be seen between the pressure roller shaft 2b' and the pressure roller 2b. Ball bearings have proven to be particularly suitable for this purpose of use.

Figure 8:
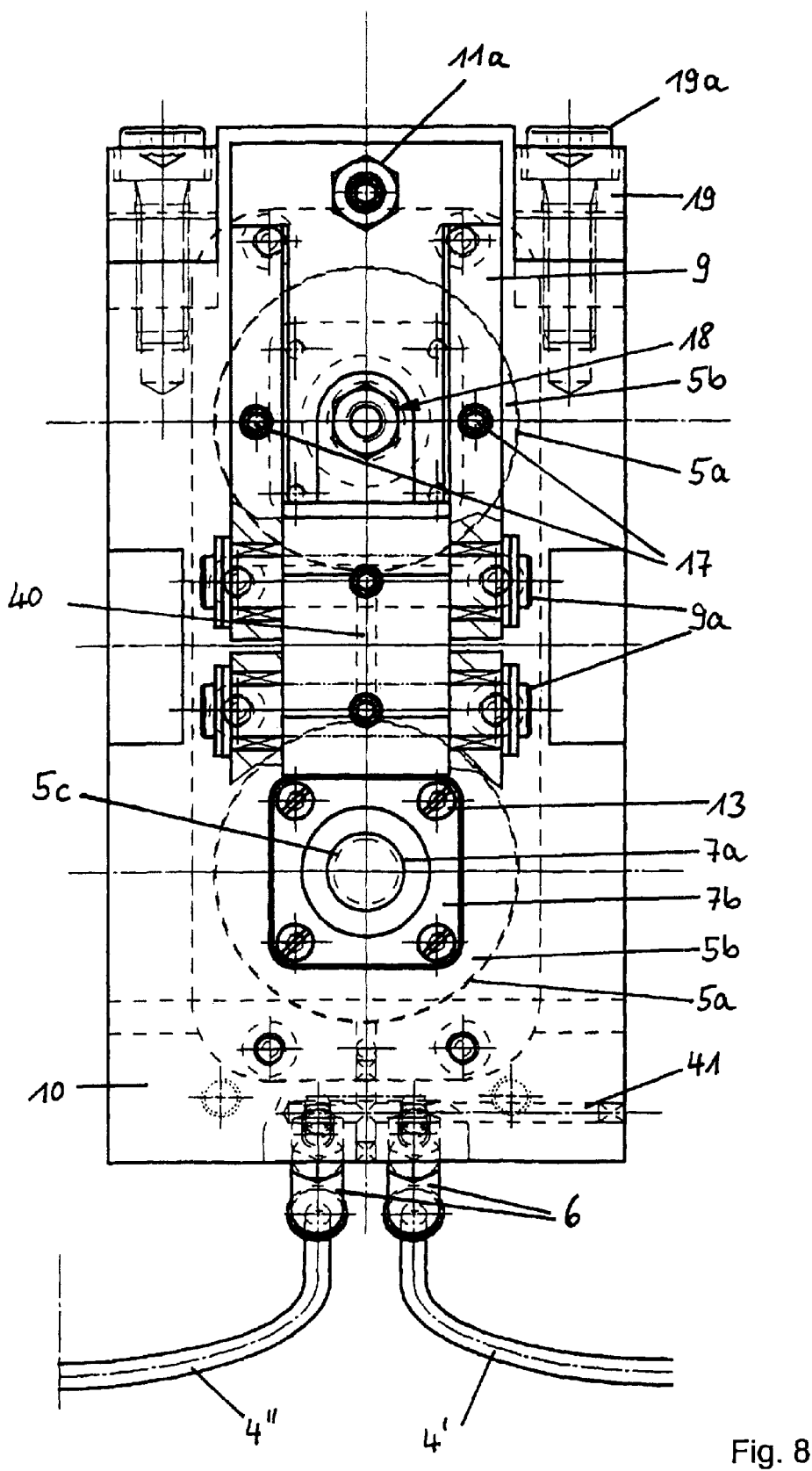

FIG. 8 shows a plan view of the base plate 10 in FIG. 4, wherein the pressure roller 2a and the pressure roller shaft 2a' have been omitted in the upper region and the pressure roller 20a, the pressure roller shaft 20a' and the bearing arrangement 9 have been omitted in the lower region. The Figure shows the screwthreaded pins 17 which are used for fixing the pressure roller shaft 2a' in the bearing arrangement 9. It is also possible to see the positions of the travel pickup 18 and the spacer 11 on the bearing arrangement 9. The position of the diaphragm 5b in the diaphragm chamber 5a is indicated by way of broken lines, the periphery of the diaphragm 5b describing a circles. A connecting passage 40 extends between the diaphragm chambers 5a, to transmit the pressure of the adjusting medium from one diaphragm chamber 5a to the other. Without the bearing arrangement 9 it is also possible to see the sealing arrangement 7 which is composed of the seal cover 7b which is fixed to the base plate 10 by screws 13 and the seal 7a.

Figure 9:
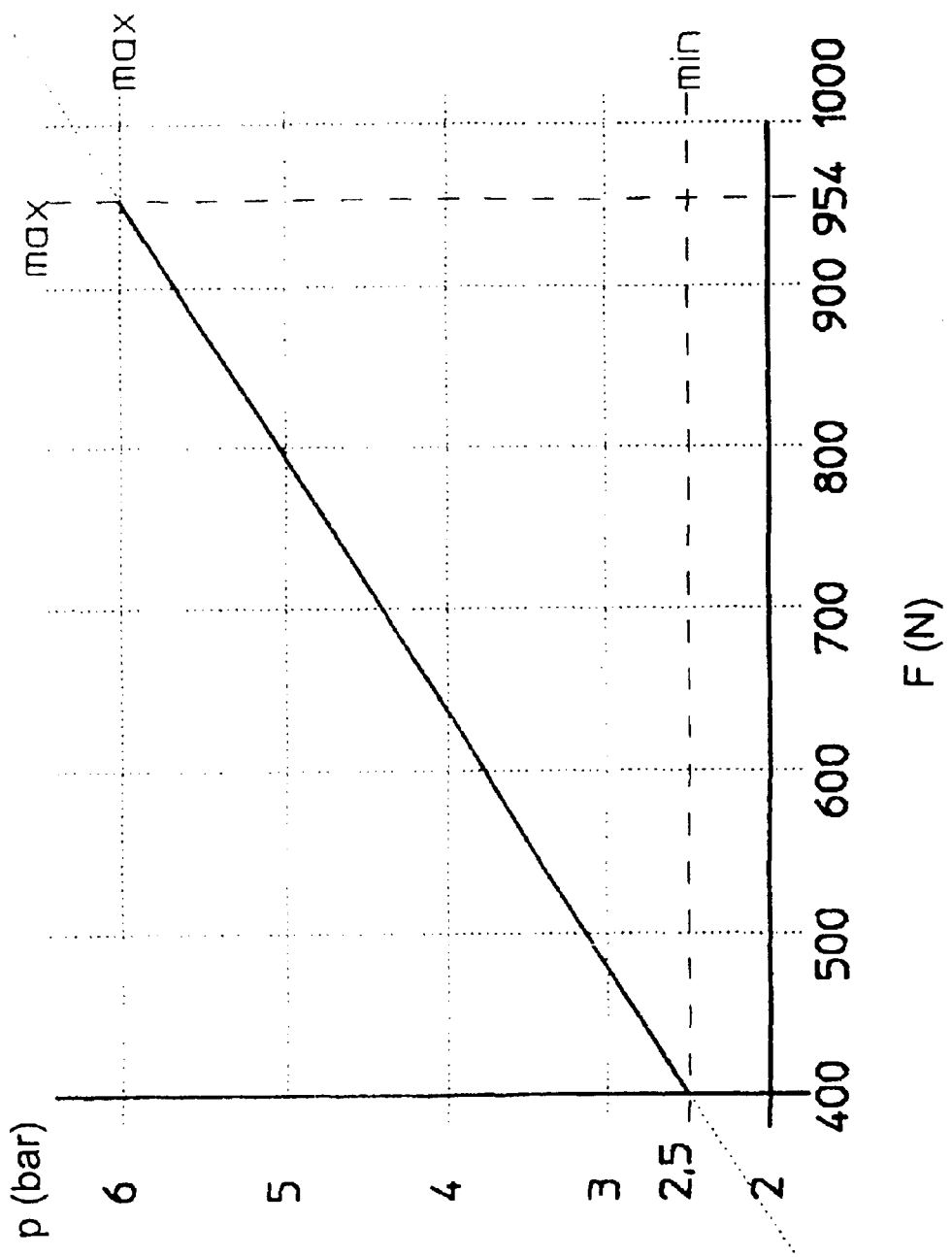

FIG. 9 shows a graph relating to the dependency between the pressure of the adjusting medium, in this case compressed air, and the pressure contact force of pneumatically resiliently supported pressure rollers (2a, 2b, 2c, 2d, 2e, 2f, 2g, 2h, 20a, 21a, 22a, 23a, 24a, 25a, 26a) as shown in FIGS. 1 through 7 in relation to the support roller 1. The pressure p (in bars) of the compressed air is applied by way of the pressure contact force F (in Newtons) of a pressure roller to the support roller. In order to actuate the diaphragm spring 5 pressures in the region of between a minimum of 2.5 bars and a maximum of 6 bars are used here, in which case pressure contact forces in the range of between 400 and 954 N are produced.

Figure 10:
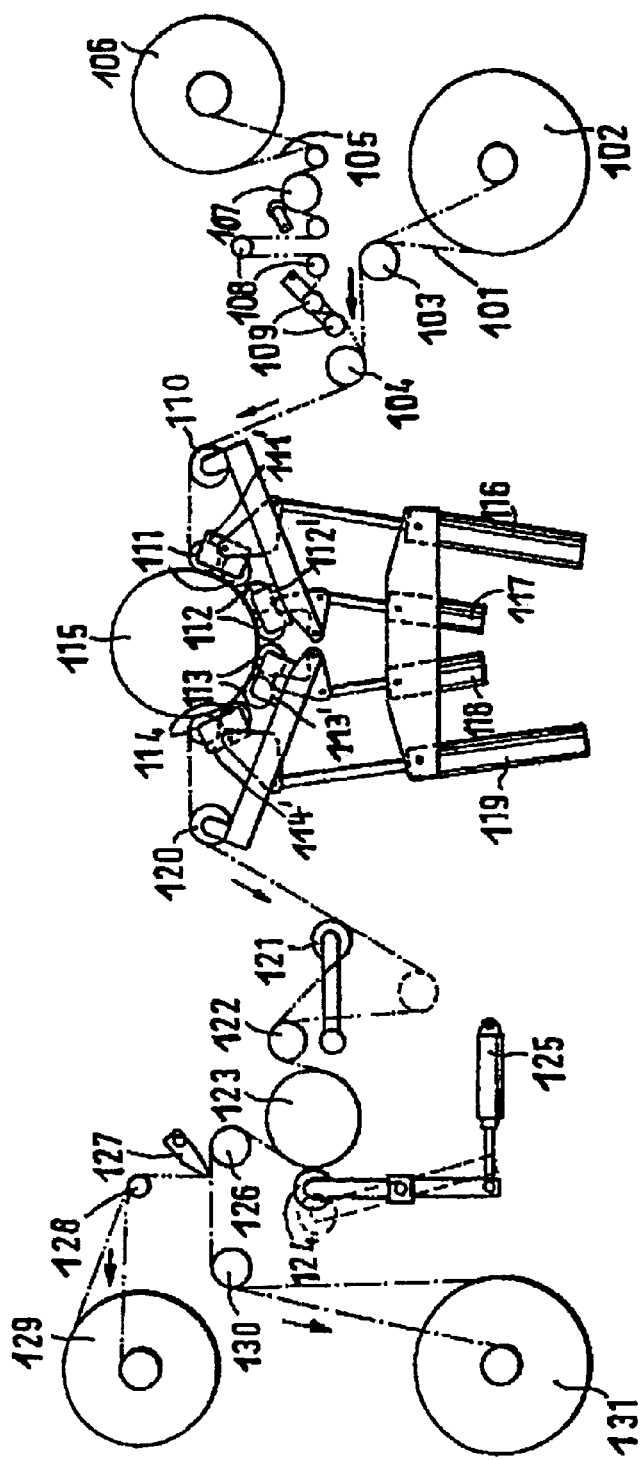

FIG. 10 shows the machine in accordance with DE 32 10 551 A1 to illustrate the operating principle of an installation in which the apparatus according to the invention is preferably used. A web of material 101 to be embossed is prepared on a braked supply roll 102 and brought together with embossing film web 105 by way of direction-changing rollers 103, 104. The embossing film web 105 is prepared on a further supply roll 106 and brought together with the web of material 101 to be embossed by way of the braking roller 107 and the direction-changing rollers 108, 109. The embossing film web 105 and the web of material 101 to be embossed are now guided jointly by way of a direction-changing roller 110 into a gap between an embossing roller 115 and pairs of pressure rollers 111, 112, 113 and 114. The apparatus according to the invention with pneumatically or hydraulically resiliently supported pressure rollers is preferably used in this part of the installation. The pairs of pressure rollers 111, 112, 113 and 114 are each individually supported on respective rocker arms 111', 112', 113' and 114' and pressed against the embossing roller 115 by way of cylinders 116, 117, 118 and 119, in which case a track of the transfer layer of the embossing film web 105 is transferred on to the web of material 101 to be embossed, in the width of the pressure rollers. After leaving the gap the webs are guided by way of various direction-changing rollers 120, 122, 126 and a dancer roller 121 for regulating the web tension. At an edge 127, the web of material 101 which has been embossed with the track is separated from the non-transferred regions of the transfer layer of the embossing film web 105 or from the carrier film of the embossing film web 105. The embossed web of material is wound on to the winding-up roll 131 and the consumed embossing film web is wound up on to the winding-up roll 129.

It should be added that a large number of possible ways of carrying the apparatus according to the invention into effect present themselves to the man skilled in the art with knowledge of the invention, in which respect various parts shown in the Figures can be designed in a different form or can be omitted. Thus for example the pressure cylinders shown in FIG. 2 could be omitted and, instead of the movement of the carriages in perpendicular relationship to the longitudinal axis of the support roller, a movement of the support roller in perpendicular relationship to the longitudinal axis of the support roller away from the carriages could be effected. It will be appreciated that variations of that nature in the apparatus according to the invention are embraced by the concept of the invention.

What is claimed is:

1. An apparatus for applying at least one surface portion of a transfer layer of a transfer film to a web of material, comprising: at least one support roller and at least one pressure roller for pressing the web of material and the transfer film against the at least one support roller, wherein the at least one pressure roller is resiliently supported by at least one resilient arrangement and wherein the apparatus has at least one adjusting device for varying a spring rate of the at least one resilient arrangement and thus for varying a pressure contact force of the at least one pressure roller against the at least one support roller, wherein the at least one pressure roller is pneumatically or hydraulically resiliently supported and wherein the at least one resilient arrangement is formed by a diaphragm spring, wherein the diaphragm spring has a diaphragm chamber the diaphragm chamber divided by a diaphragm into a primary side and a secondary side and a piston rigidly connected to the diaphragm on the secondary side transmitting a spring force to the at least one pressure roller, wherein the diaphragm spring on the secondary side has a sealing arrangement which protects the diaphragm spring from the ingress of dust and corrosive media.

2. Apparatus as set forth in claim 1 wherein the at least one adjusting device includes at least one control unit for adjusting a spring rate by way of at least one regulating valve and at least one supply line, and wherein at least one of the supply lines is connected to the at least one resilient arrangement for supplying same with an adjusting medium which is formed by compressed air or a hydraulic fluid.

3. Apparatus as set forth in claim 2 wherein the at least one resilient arrangement is remotely controllable by the at least one control unit.

4. Apparatus as set forth in claim 2 wherein the control unit is suitable for the processing of digital setting values.

5. Apparatus as set forth in claim 1 wherein the sealing arrangement is formed from a seal and a seal cover, wherein at its side remote from the diaphragm the piston is guided through the seal.

6. Apparatus as set forth in claim 1 wherein the at least one pressure roller is arranged on at least one carriage which is movable in the direction of the longitudinal axis of the at least one support roller.

7. Apparatus as set forth in claim 6 wherein the at least one carriage is movable at least by the length of the at least one support roller in the direction of the longitudinal axis of the at least one support roller.

8. Apparatus as set forth in claim 1 wherein the at least one pressure roller shaft of the respective pressure roller is mounted in a bearing arrangement which is of a U-shaped cross-section viewed perpendicularly to the longitudinal axis of the pressure roller shaft.

9. Apparatus as set forth in claim 8 wherein the bearing arrangement is connected to a base plate by way of a bearing arrangement shaft, and wherein the bearing arrangement shaft is arranged in parallel relationship with the pressure roller shaft.

10. Apparatus as set forth in claim 9 wherein the bearing arrangement has a travel pickup which bears loosely against the piston in such a way that the pressure roller shaft is movable on a circular path about the bearing arrangement shaft upon a change in the position of the piston.

11. Apparatus as set forth in claim 9 wherein the bearing arrangement is hingedly connected to the piston in such a way that the pressure roller shaft is movable on a circular path about the bearing arrangement shaft upon a change in the position of the piston.

12. Apparatus as set forth in claim 9 wherein a spacer is arranged at least one of at the bearing arrangement and at the base plate, which prevents direct contact between the bearing arrangement and the base plate.

13. Apparatus as set forth in claim 1 wherein at least two pressure rollers are arranged in mutually parallel relationship along the longitudinal axis of the at least one support roller.

14. Apparatus as set forth in claim 13 wherein the resilient arrangements of the at least two parallel pressure rollers are each connected to a respective separate supply line for the adjusting medium.

15. Apparatus as set forth in claim 13 wherein the resilient arrangements of the at least two parallel pressure rollers are connected to a common supply line for the adjusting medium.

16. Apparatus as set forth in claim 13 wherein the at least two parallel pressure rollers are arranged on a first carriage.

17. Apparatus as set forth in claim 1 wherein at least two pressure rollers are arranged in a row along a support roller diameter.

18. Apparatus as set forth in claim 17 wherein the resilient arrangements of the at least two pressure rollers arranged in a row are each connected to a respective separate supply line for the adjusting medium.

19. Apparatus as set forth in claim 9 wherein two pressure rollers are arranged on the base plate in a row along a support roller diameter as a pair of support rollers.

20. Apparatus as set forth in claim 18 wherein the at least one resilient arrangement of the two pressure rollers arranged in a row is integrated into the base plate.

21. Apparatus as set forth in claim 19 wherein a common resilient arrangement is provided for the two pressure rollers.

22. Apparatus as set forth in claim 19 wherein a respective separate resilient arrangement is provided for each of the two pressure rollers.

23. Apparatus as set forth in claim 1 wherein the at least one support roller is heated.

\* \* \* \* \*

UNITED STATES PATENT AND TRADEMARK OFFICE
CERTIFICATE OF CORRECTION

PATENT NO. : 7,900,678 B2
APPLICATION NO. : 11/570344
DATED : March 8, 2011
INVENTOR(S) : Mitsam et al.

Page 1 of 1

It is certified that error appears in the above-identified patent and that said Letters Patent is hereby corrected as shown below:

Column 8, line 42:

Now reads:     "shaft $2a, 20a$'"

Should read:   --shaft $2a'$, $20a'$--

Column 8, line 66:

Now reads:     "carriage $5a$ and is"

Should read:   --carriage $8a$ and is--

Column 9, line 3:

Now reads:     "shaft $2b$, which"

Should read:   --shaft $2b'$, which--

Column 9, line 33:

Now reads:     "describing a circles."

Should read:   --describing a circle.--

Signed and Sealed this
Second Day of October, 2012

David J. Kappos
*Director of the United States Patent and Trademark Office*